United States Patent
Gailloux et al.

(10) Patent No.: US 11,461,759 B1
(45) Date of Patent: Oct. 4, 2022

(54) SYSTEM FOR TRANSMITTING CUSTOMER DATA FROM A DEVICE

(71) Applicant: T-Mobile Innovations LLC, Overland Park, KS (US)

(72) Inventors: Michael A. Gailloux, Overland Park, KS (US); Lauren R. King, Somerset, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 522 days.

(21) Appl. No.: 15/987,900

(22) Filed: May 24, 2018

Related U.S. Application Data

(63) Continuation of application No. 14/313,968, filed on Jun. 24, 2014, now Pat. No. 10,007,903.

(51) Int. Cl.
*G06Q 30/02* (2012.01)
*G06Q 20/32* (2012.01)

(52) U.S. Cl.
CPC ....... *G06Q 20/322* (2013.01); *G06Q 30/0267* (2013.01)

(58) Field of Classification Search
CPC .................................................... G06Q 30/02
See application file for complete search history.

(56) References Cited

U.S. PATENT DOCUMENTS

| | | |
|---|---|---|
| 5,727,163 A | 3/1998 | Bezos |
| 5,991,372 A | 11/1999 | Davenport D'Ingianni et al. |
| 5,991,749 A | 11/1999 | Morrill, Jr. |
| 7,523,486 B1 | 4/2009 | Turner |
| 8,099,363 B1 | 1/2012 | Kilchenstein, Jr. |
| 8,151,328 B1 | 4/2012 | Lundy et al. |
| 8,290,875 B2 | 10/2012 | Itoi et al. |
| 8,352,370 B1 | 1/2013 | White et al. |
| 8,756,156 B1 * | 6/2014 | Campi ................ G06Q 20/102 705/40 |
| 8,923,812 B1 | 12/2014 | Koum et al. |
| 9,014,662 B1 | 4/2015 | Gailloux et al. |
| 9,147,187 B1 | 9/2015 | Gailloux et al. |
| 9,582,787 B2 | 2/2017 | Muthukrishnan et al. |

(Continued)

FOREIGN PATENT DOCUMENTS

WO   WO 2012/167116 A2 * 12/2012 ............. G06Q 20/40

OTHER PUBLICATIONS

Chen,W.;Hancke,G.P.;Mayes,K.E.;Lien,Y.; Chiu,J.H.,NFC Mobile Transaction and Authentication Based on GSM Network (English),2010 Second International Workshop on Near Field Communication (pp. 83-89), Apr. 1, 2010 (Year: 2010).*

(Continued)

*Primary Examiner* — Marilyn G MacAsiano

(57) ABSTRACT

A method is provided for communication by a mobile telecommunication device. The method comprises detecting, by the mobile telecommunication device, an input related to an advertisement displayed on the mobile telecommunication device and associated with an online merchant. The method further comprises, responsive to detecting the input, transmitting, by the mobile telecommunication device, to the online merchant, a token stored in a memory location in the mobile telecommunication device, wherein the token contains information for facilitating a transaction between the mobile telecommunication device and the online merchant.

20 Claims, 6 Drawing Sheets

(56) References Cited

U.S. PATENT DOCUMENTS

| | | | |
|---|---|---|---|
| 9,792,603 | B1 | 10/2017 | Gailloux et al. |
| 9,830,587 | B1 | 11/2017 | Bell et al. |
| 9,916,601 | B2* | 3/2018 | Mahadevan ....... G06Q 30/0264 |
| 10,007,903 | B1 | 6/2018 | Gailloux et al. |
| 10,289,995 | B1 | 5/2019 | Gailloux et al. |
| 2002/0107755 | A1 | 8/2002 | Steed et al. |
| 2006/0265327 | A1 | 11/2006 | Rao et al. |
| 2007/0061333 | A1 | 3/2007 | Ramer et al. |
| 2007/0156436 | A1 | 7/2007 | Fisher et al. |
| 2009/0271246 | A1 | 10/2009 | Alvarez et al. |
| 2010/0161433 | A1 | 6/2010 | White |
| 2011/0078081 | A1 | 3/2011 | Pirzadeh et al. |
| 2011/0143711 | A1 | 6/2011 | Hirson et al. |
| 2011/0208658 | A1 | 8/2011 | Makhotin |
| 2011/0208659 | A1* | 8/2011 | Easterly ................. G06Q 20/20 705/79 |
| 2011/0295740 | A1 | 12/2011 | Blackwell |
| 2012/0029990 | A1 | 2/2012 | Fisher |
| 2012/0150667 | A1 | 6/2012 | Salari |
| 2012/0174202 | A1* | 7/2012 | Relyea .................... H03M 7/30 726/6 |
| 2012/0289188 | A1 | 11/2012 | Marcus et al. |
| 2013/0013499 | A1 | 1/2013 | Kalgi |
| 2013/0054320 | A1 | 2/2013 | Dorso et al. |
| 2013/0198066 | A1 | 8/2013 | Wall et al. |
| 2013/0268752 | A1 | 10/2013 | Morecki et al. |
| 2014/0058812 | A1* | 2/2014 | Bender .............. G06Q 30/0209 705/14.12 |
| 2014/0143151 | A1 | 5/2014 | Dhar et al. |
| 2014/0344033 | A1* | 11/2014 | Driscoll ................. G06V 20/46 705/14.1 |
| 2014/0359484 | A1 | 12/2014 | Morecki et al. |
| 2015/0081435 | A1 | 3/2015 | Griffiths |
| 2015/0101062 | A1 | 4/2015 | Silver et al. |
| 2015/0110257 | A1 | 4/2015 | Barbulescu et al. |
| 2015/0186941 | A1* | 7/2015 | Anthony ............ G06Q 30/0257 705/14.55 |
| 2015/0302470 | A1 | 10/2015 | Dru et al. |
| 2015/0356556 | A1* | 12/2015 | Celikyilmaz ...... G06Q 20/3224 705/14.51 |
| 2016/0012465 | A1* | 1/2016 | Sharp ................... G06Q 20/386 705/14.17 |
| 2020/0320538 | A1 | 10/2020 | Smith |

OTHER PUBLICATIONS

Office Action dated Aug. 29, 2013, U.S. Appl. No. 13/714,178, filed Apr. 3, 2012.
Final Office Action dated Mar. 26, 2014, U.S. Appl. No. 13/714,178, filed Apr. 3, 2012.
Advisory Action dated Jun. 16, 2014, U.S. Appl. No. 13/714,178, filed Apr. 3, 2012.
Examiners Answer dated Feb. 4, 2015, U.S. Appl. No. 13/714,178, filed Apr. 3, 2012.
Second and Supplemental Examiners Answer dated Mar. 9, 2015, U.S. Appl. No. 13/714,178, filed Apr. 3, 2012.
Decision on Appeal dated Mar. 22, 2017, U.S. Appl. No. 13/714,178, filed Apr. 3, 2012.
Notice of Allowance dated Jun. 22, 2017, U.S. Appl. No. 13/714,178, filed Apr. 3, 2012.
Restriction Requirement dated Mar. 19, 2015, U.S. Appl. No. 13/759,034, filed Feb. 4, 2013.
FAIPP Pre-Interview Communication dated Sep. 14, 2015, U.S. Appl. No. 13/759,034, filed Feb. 4, 2013.
FAIPP Office Action dated Dec. 8, 2015, U.S. Appl. No. 13/759,034, filed Feb. 4, 2013.
Final Office Action dated Jun. 14, 2016, U.S. Appl. No. 13/759,034, filed Feb. 4, 2013.
Notice of Allowance dated Jun. 16, 2017, U.S. Appl. No. 13/759,034, filed Feb. 4, 2013.
Restriction Requirement dated Jan. 23, 2017, U.S. Appl. No. 14/258,882, filed Apr. 22, 2014.
Office Action dated Jun. 15, 2017, U.S. Appl. No. 14/258,882, filed Apr. 22, 2014.
Final Office Action dated Jan. 2, 2018, U.S. Appl. No. 14/258,882, filed Apr. 22, 2014.
Advisory Action dated Apr. 12, 2018, U.S. Appl. No. 14/258,882, filed Apr. 22, 2014.
Notice of Allowance dated Jan. 7, 2019, U.S. Appl. No. 14/258,882, filed Apr. 22, 2014.
Office Action dated Dec. 10, 2019, U.S. Appl. No. 16/359,888, filed Mar. 20, 2019.
FAIPP Pre-Interview Communication dated Apr. 1, 2016, U.S. Appl. No. 14/313,968, filed Jun. 24, 2014.
FAIPP Office Action dated Jun. 8, 2016, U.S. Appl. No. 14/313,968, filed Jun. 24, 2014.
Final Office Action dated Aug. 12, 2016, U.S. Appl. No. 14/313,968, filed Jun. 24, 2014.
Advisory Office Action dated Oct. 12, 2016, U.S. Appl. No. 14/313,968, filed Jun. 24, 2014.
Notice of Allowance dated Feb. 26, 2018, U.S. Appl. No. 14/313,968, filed Jun. 24, 2014.
Dashlane, "Instant checkout, smart auto fill, secure passwords—Dashlane", https://dashlane.com/, last accessed Nov. 9, 2012.
Dashlane, "Secure encryption of your personal—Dashlane", https://dashlane.com/en/security, last accessed Nov. 9, 2012.
Dashlane, "Dashlane Security Whitepaper—Protection of User Data in Dashlane", Dashlane, Nov. 2011.
Dashlane, "Checkout easily online using Dashlane", https://dashlane.com/en/features, last accessed Nov. 9, 2012.
Dashlane, "Dashlane lets you fill out forms with a single click", https://dashlane.com/en/features/smartformfilling, last accessed Nov. 9, 2012.
Dashlane, "Securely Share web account passwords and important notes", https://dashlane.com/en/features/securesending, last accessed Nov. 9, 2012.
N. Leavitt, "Payment Applications Make E-Commerce Mobile", in Computer, vol. 43, No. 12, pp. 19-22, Dec. 2010. URL: http://ieeexplore.ieee.org/stamp/stamp.jsptp=arnumber=5662542 isnumber=5622531 (Year 2010).
Gailloux, Michael A., et al., "Companion Applets for Web-Based Transactions," filed Mar. 20, 2019 U.S. Appl. No. 16/359,888.
Office Action dated Jul. 24, 2020, U.S. Appl. No. 16/359,888, filed Mar. 20, 2019.
Notice of Allowance dated Jun. 2, 2021, U.S. Appl. No. 16/359,888, filed Mar. 20, 2019.
Marguerite Reardon, "Mobile Payments: A solution in search of a problem?" Oct. 22, 2012. Retrieved from https://www.cnet.com/news/mobile-payments-asolution-in-search-of-a-problem/ (Year:2012).
Shanshan Ma, "Proceed to Checkout: Payments on the Mobile Web", Sep. 19, 2011. Retrieved from https:/www.uxmatters.com/mt/archives/2011/09/proceed-to-checkout-payments-on-the-mobile-web.php (Year:2011).
No author, "Does Mobile Processing Scare You? It Should." Copyright 2013 SecurityMetrics (Year 2013).

\* cited by examiner

SYSTEM FOR TRANSMITTING CUSTOMER DATA FROM A DEVICE

CROSS-REFERENCE TO RELATED APPLICATIONS

This application claims priority as a continuation application to U.S. patent application Ser. No. 14/313,968 filed on Jun. 24, 2014, entitled "System for Transmitting Customer Data From a Device," by Michael A. Gailloux, et al., which is herein incorporated by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile telecommunication devices such as smart phones, tablet computers, and similar devices may be capable of displaying advertisements delivered via the internet. An online merchant may produce an advertising campaign that includes a plurality of advertisements designed for display on such devices and may make the advertisements available to an advertising brokerage. When an opportunity arises to display an advertisement on a mobile device, the mobile device may send a notification of the opportunity to the wireless telecommunication service provider providing service to the mobile device. The service provider may then retrieve an advertisement from the brokerage and transmit the advertisement to the mobile device via the internet.

A user of the mobile device may tap on the advertisement or respond to the advertisement in some other manner to obtain more information about an advertised product or perhaps to purchase an advertised product. An indication that the user has responded to the advertisement may be sent directly to the online merchant or may be sent to the online merchant via the service provider. The online merchant may then provide the requested information to the mobile device or display on the mobile device a screen that allows the user to enter billing information, shipping information, and other information needed to complete an online sales transaction.

SUMMARY

In an embodiment, a mobile telecommunication device is disclosed. The device comprises a memory location and a processor. The memory location is configured to store a token containing information for facilitating a transaction between the device and an online merchant. The processor is configured such that, responsive to the device detecting an input related to an advertisement that is associated with the online merchant and that is displayed on the device, the device transmits the token to the online merchant less than one second after the input is detected. The information for facilitating the transaction comprises at least one of: a user profile for the user of the device, wherein the user profile includes at least one of the user's age, the user's gender, the user's income, the user's location, the user's billing information, the user's shipping information, a history of web sites the user has visited, a history of the user's use of applications on the device, and preferences expressed by the user; information about the device including at least one of a model identifier for the device and at least one capability of the device; a personal identification number for the user of the device; and a key for retrieving from a service provider for the device at least one of the user profile, the information about the device, and the personal identification number.

In another embodiment, a method for facilitating an online transaction on a mobile telecommunication device is disclosed. The method comprises receiving, by the mobile telecommunication device, a first message that includes an advertisement to be displayed on the mobile telecommunication device and further includes a token containing information for facilitating the online transaction. The method further comprises transmitting, by the mobile telecommunication device, responsive to detecting an input related to the advertisement, to an online merchant associated with the advertisement, a second message containing the token. The second message may be transmitted less than one second after the input is detected.

In another embodiment, a method for communication by a mobile telecommunication device is disclosed. The method comprises detecting, by the mobile telecommunication device, an input related to an advertisement displayed on the mobile telecommunication device and associated with an online merchant. The method further comprises, responsive to detecting the input, transmitting, by the mobile telecommunication device, to the online merchant, a token stored in a memory location in the mobile telecommunication device, wherein the token contains information for facilitating a transaction between the mobile telecommunication device and the online merchant. The token may be transmitted less than one second after the input is detected.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
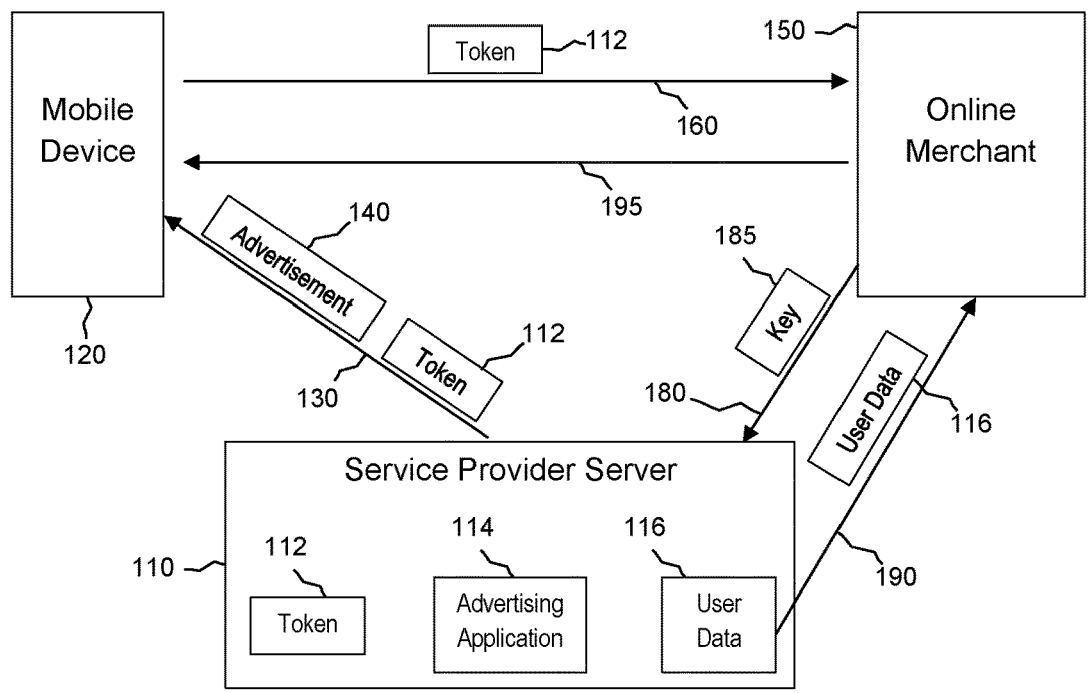
FIG. 1 is an illustration of a system for providing user and device information to an online merchant according to an embodiment of disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the present disclosure provide systems and methods that may facilitate online transactions for both online merchants and customers of online merchants. In an embodiment, when a user of a mobile telecommunication device responds to an online advertisement displayed on the device, perhaps by clicking on the advertisement or in some other manner, a packet of information about the user and/or the device is sent to the online merchant that placed the advertisement. The information packet may be appended by the device to a message sent by the device indicating that the response occurred or to some other message sent from the device to the online merchant. As described in more detail below, the information packet may have been previously stored on the device or on a server computer or a similar component managed by a provider of wireless telecommunication services to the device. As described in more detail below, the information in the packet may include, among other items, the model and capabilities of the mobile device and a profile of the user of the mobile device. As described in more detail below, the online merchant may use the information in the packet in several different ways to facilitate a transaction between the online merchant and the user and thereby possibly increase the likelihood that the user will make an online purchase. For example, the online merchant may use the information to verify data entered by the user, to fill out web-based forms on behalf of the user, or to send additional advertisements targeted to the user based on the user profile and/or the device information. The information packet may additionally or alternatively contain information, such as a password or some other identifier, that allows the online merchant to gain access to user-related data that is stored on a computer system operated by the user's telecommunication service provider. The online merchant may then use that data in one or more of the manners mentioned above to attempt to increase the likelihood that the user will make an online purchase.

The entire procedure from the time the user clicks on the advertisement to the time information (e.g., the information packet containing information about the user and/or the device) from the online merchant is received at the mobile device may occur in less than one second, thus further improving the user's online purchasing experience. In some contexts this may be referred to as a sub-second response time. This sub-second response time may further increase the likelihood of the user making an online purchase and/or being presented information more closely adapted to his or her interests.

Briefly, the disclosed embodiments may consist of three phases or stages, each bridging a different gap in the online purchasing procedure. A first phase may be the creation of the information packet. A second phase may be the use of information in the information packet to customize a subsequent advertisement that is transmitted to a device in response to a user's response to a previous advertisement. A third phase may be the use of information in the information packet to automatically populate a sales form on behalf of a user.

The disclosed systems and methods may be beneficial to mobile device users since the feature of having information such as a credit card number or a shipping address automatically populated in a form may ease the process of performing an online transaction. For example, if a user wishes to purchase an item advertised by an online merchant, the user may send an indication of that wish to the online merchant. The online merchant may then return to the user a page containing a form with a large number of fields to be filled in with information such as name, billing address, shipping address, credit card number, and other information typically used in online transactions. Entering such information may be difficult and tedious for the user, especially when using the small display screen and small data entry mechanisms typically present on a mobile device. The inconvenience of manually entering such information into a mobile device may cause the user to abandon the transaction and thus may cause the online merchant to lose a potential sale. The methods disclosed herein for automatically populating one or more fields in an online form may reduce the difficulty and tediousness the user may experience if the form were to be completed fully manually. This may increase the likelihood that the user will carry a sales transaction through to completion rather than abandoning the transaction and possibly forgetting to complete the transaction at a later time on a device with more convenient input and output mechanisms.

Online merchants may also benefit from the disclosed systems and methods since the increased likelihood that a sales transaction will be carried through to completion may increase online sales. Online merchants may also benefit from the ability to target advertisements to users based on the device information and/or user profile available to the merchants via the information packet. A wireless telecommunication service provider may also benefit by offering such systems and methods since online merchants may be more likely to place advertisements through providers that offer such features than through providers that do not.

A user of a mobile device may respond to an online advertisement by tapping on the advertisement or in some other manner. Any input that a user provides into a mobile device in response to an advertisement on the device will be referred to herein as a click-through, but it should be understood that the input may not be a traditional mouse click. When a mobile device receives a click-through, the mobile device may transmit a message indicating that the click-through occurred and that additional information should be sent to the device in response to the click-through. The message may be sent directly to the online merchant that produced the advertisement or may be sent to the online merchant via the wireless telecommunication service provider for the mobile device. The message may be a Hypertext Transfer Protocol (HTTP) Get command or some other type of message that causes the online merchant's response to the click-through to be transmitted to the mobile device. Any such message will be referred to herein as a click-through indication.

In an embodiment, a packet of information that will be referred to hereinafter as a token may be appended to a click-through indication transmitted from a mobile device to an online merchant. The token may include one or more of a user profile for a user of the mobile device, information about the mobile device, a personal identification number (PIN) for the user, and/or information that allows the online merchant to retrieve data about the user from the user's wireless telecommunication service provider. As described in more detail below, the information packet may be retrieved from a storage location on the mobile device or may be transmitted to the mobile device from a server computer or a similar component managed by the wireless telecommunication service provider. Sending the packet of information and/or the token as part of a click-through indication may support the sub-second response time discussed above and may contribute to both an enhanced user experience and improved opportunities for a merchant successfully completing an online sale.

Information in the user profile may include, but is not limited to, the user's age, the user's gender, the user's income level or income range, the user's current physical location, billing information for the user, shipping information for the user, whether credit card information for the user is on file, and/or behavior information associated with the user. The behavior information may include a history of web sites the user has visited, a history of the user's use of applications on the mobile device, preferences expressed by the user, and/or other information that may be indicative of the user's tendencies while using the mobile device.

The information about the mobile device may include, but is not limited to, the device model and the capabilities of the device, such as processing capabilities, display capabilities, and internet connectivity capabilities. As described in more detail below, the PIN may be used by the online merchant to verify the user's identity. As described in more detail below, the information that allows the online merchant to retrieve data about the user from the user's wireless telecommunication service provider may be used to retrieve all or part of the user profile information when such information is not included in the token.

In some embodiments, a token may be generated once and stored and may then be updated at regular intervals or as information in the token changes. In other embodiments, a token is not stored but instead may be generated at substantially the time an advertisement is to be transmitted from the wireless telecommunication service provider to the mobile device. In the embodiments where the token is stored, the token may be stored on a server computer managed by the service provider or may be stored on the mobile device. The generation of the token may be the bridge of the first gap in the online purchasing procedure.

FIG. 1 illustrates an embodiment where the token is stored on a service provider server 110 or a similar component managed by a wireless telecommunication service provider. The service provider provides wireless telecommunication service to a mobile device 120. The service provider server 110 may include, among other components, a stored token 112 as described above, an advertising application 114, and user data 116 pertaining to a user of the mobile device 120. While the token 112, the advertising application 114, and the user data 116 are shown residing on a single service provider server 110, it should be understood that these components may reside on different servers managed by the service provider.

The advertising application 114 may be capable of managing the display of advertisements on the mobile device 120. That is, when an opportunity arises to display an advertisement on the mobile device 120, the advertising application 114 may send the mobile device 120 a message 130 that instructs the mobile device 120 to display an advertisement 140 included in the message 130, such as a banner advertisement, a pop-up advertisement, or some other type of advertisement typically used in online advertising. The advertisement 140 may advertise a product offered by an online merchant 150, which may have previously produced the advertisement 140 and provided the advertisement 140 to an advertising brokerage service. The advertising application 114 may determine that the advertisement 140 is an appropriate advertisement to be displayed at the time based on the current circumstances of the mobile device 120 and on preferences expressed by the online merchant 150. For example, the online merchant 150 may wish for certain advertisements to be displayed when mobile devices are present in certain locations. Alternatively, the advertising application 114 may select the advertisement 140 in some other manner. In any case, the advertising application 114 may retrieve the advertisement 140 from the brokerage and take the necessary steps to include the advertisement 140 in the message 130 to the mobile device 120.

In an embodiment, the advertising application 114 appends the previously generated and stored token 112 to the advertisement 140 in the message 130 or otherwise includes the token 112 in the message 130 that is sent to the mobile device 120 to cause the advertisement 140 to be displayed on the mobile device 120. Alternatively, rather than the token 112 having been stored on the service provider server 110, the token 112 may be generated at substantially the time the advertisement 140 is prepared for transmission to the mobile device 120 and may then be included in the message 130. In the latter case, the token 112 may not be stored on the service provider server 110 after being transmitted, and another token 112 may be generated when another advertisement is sent to the mobile device 120.

In an embodiment, the token 112 is included in all messages 130 that include advertising content such as the advertisement 140. In an alternative embodiment, the token 112 is included in only certain messages 130 that include advertising content. For example, the online merchant 150 may prefer to receive the token 112 only when click-throughs occur in response to specified advertisements within an advertising campaign produced by the online merchant 150. The online merchant 150 may convey that preference to the advertising application 114, and the advertising application 114 may include the token 112 only in the messages 130 that include the specified advertisements.

The above actions that are described as being taken by the advertising application 114 may be taken by more than one application. For example, the actions involving selecting an advertisement to be displayed, retrieving that advertisement from the advertising brokerage, and sending that advertisement to the mobile device 120 may be performed by an existing application residing on the service provider server 110 to perform those functions. In such a case, the advertising application 114 may be an additional application that performs only the actions that involve the token 112. Alternatively, the advertising application 114 may be an existing application for selecting, retrieving, and transmitting advertisements that has been modified to include the capabilities involving the token 112.

Responsive to receiving the message 130, the mobile device 120 may display the advertisement 140 and temporarily store the token 112 in a memory location. If the mobile device 120 receives a click-through on the advertisement 140, the mobile device 120 may send a click-through indication 160 to the online merchant 150. In an embodiment, the mobile device 120 may retrieve the token 112 from its temporary storage location and include the token 112 in the click-through indication 160. The online merchant 150 may then use the information in the token 112 in several different ways, as described below.

Figure 2:
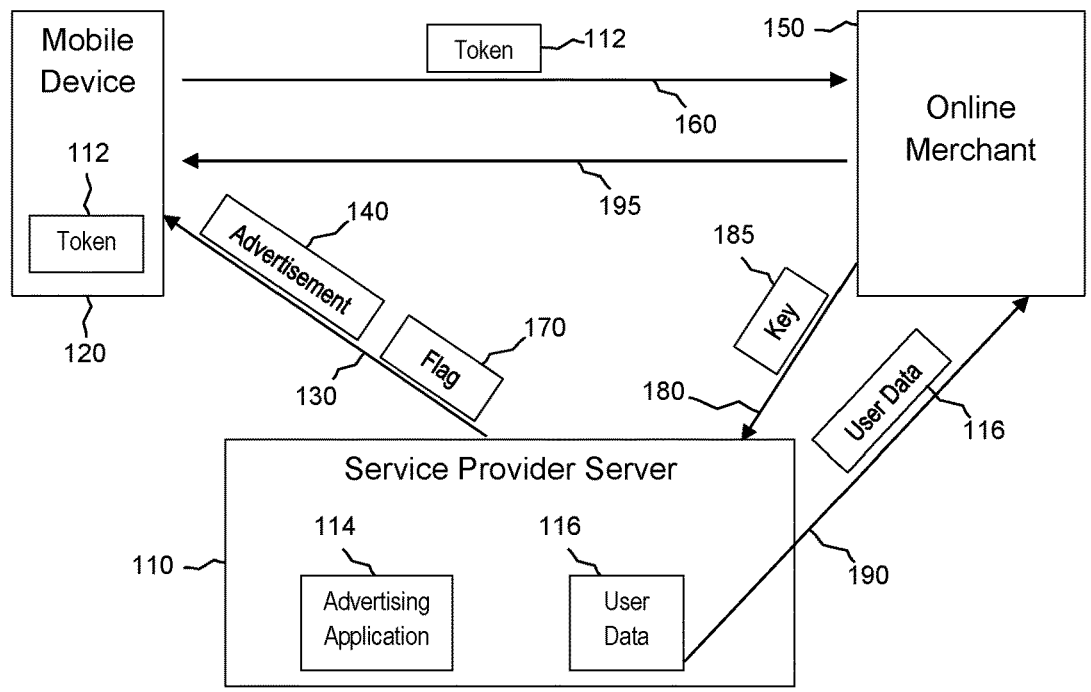
FIG. 2 is an illustration of a system for providing user and device information to an online merchant according to another embodiment of disclosure.

FIG. 2 illustrates an alternative embodiment in which the token 112 is stored on the mobile device 120 rather than on the service provider server 110. In an embodiment, the token 112 may be created at substantially the time the mobile device 120 is initially activated and may then be populated with information available at the time of activation and stored in a memory location on the mobile device 120. The token 112 may then be updated as behavioral information for the user of the mobile device 120 becomes available and/or as previously populated information changes. Alternatively, the token 112 may be created at some time after the activation of the mobile device 120, such as the time when an application providing the features disclosed herein is installed on the mobile device 120. The token 112 may be populated with information available at that time and then stored on the mobile device 120 and may be updated as needed thereafter.

In the embodiment of FIG. 2, when the service provider server 110 sends the message 130 to the mobile device 120 indicating that the advertisement 140 is to be displayed on the mobile device 120, the message 130 contains the advertisement 140 but not the token 112. However, the message 130 may contain a flag 170 or some other type of indicator indicating that the token 112 is to be included in the click-through indication 160 sent in response to a click-through on the advertisement 140. As mentioned above, the token 112 may be associated with all advertisements the service provider server 110 sends to the mobile device 120 or with only a portion of those advertisements. If the token 112 is associated with all the advertisements, the mobile device 120 may include the token 112 in all click-through indications 160 sent to the online merchant 150, and there may be no need to include the flag 170 in the message 130. If the token 112 is associated with only a portion of the advertisements, the flag 170 may be included in the message 130 to indicate that the advertisement 140 is an advertisement for which the click-through indication 160 is to include the token 112. That is, if the flag 170 is included in the message 130 along with the advertisement 140, the mobile device 120 includes the token 112 in click-through indications 160 transmitted in response to click-throughs on the advertisement 140. If the flag 170 is not included in the message 130 along with the advertisement 140, the mobile device 120 does not include the token 112 in click-through indications 160 transmitted in response to click-throughs on the advertisement 140. In other embodiments, some other type of indication may be used to specify the advertisements for which the token 112 is to be included in the click-through indication 160.

As mentioned above, the information included in the token 112 may include a user profile, mobile device information, a PIN, and/or a key for the online merchant 150 to gain access to user data 116 stored by the wireless telecommunication service provider. In an embodiment, the user profile information, the mobile device information, and the PIN are included in the token 112, and the key is not included. In another embodiment, only the key is included in the token 112, and no user profile information, no mobile device information, and no PIN are included. In another embodiment, the key is included in the token 112 along with at least a portion of the user profile information, at least a portion of the mobile device information, and/or the PIN. In the latter embodiment, the portion of information included in the token 112 along with the key may be sufficient for the online merchant 150 to begin a transaction with a user, receive preliminary information about a user, and/or send preliminary information to the mobile device 120. If the online merchant 150 wishes to proceed further with a transaction, receive additional information about the user, and/or send additional information to the mobile device 120, the online merchant 150 may use the key to obtain additional information from the service provider server 110.

In the embodiments where the key is included in the token 112, after receiving the key in the token 112, the online merchant 150 may send a message 180 containing the key 185 to the service provider server 110. User data 116 associated with the user who responded to the advertisement 140, and thereby initiated the transmission of the token 112 to the online merchant 150, may be stored on the service provider server 110. The user data 116 may include at least a portion of the user profile information, at least a portion of the mobile device information, and/or the PIN. Responsive to receiving the message 180 and confirming the validity of the key 185, the service provider server 110 may send a message 190 to the online merchant 150 containing at least a portion of the user data 116. Thus, the online merchant 150 may gain access to the user profile, the device information, and the PIN entirely via the token 112, entirely via the user data 116 retrieved from the service provider server 110, or partially via the token 112 and partially via the user data 116 retrieved from the service provider server 110.

Regardless of whether the online merchant 150 receives the user profile, the device information, and the PIN via the token 112 or via the user data 116 in the message 190, the online merchant 150 may use that information in several different ways, such as reducing fraud, assisting a user in completing a form, or targeting advertisements or other messages to one or more specific users. The online merchant 150 may use such information to reduce fraud by comparing that information to ostensibly similar information entered by a user into the mobile device 120 and sent to the online merchant 150 in a transmission separate from the message 160 containing the token 112. If the information entered by the user into the mobile device 120 matches information received by the online merchant 150 via the token 112 or via the message 190 containing the user data 116, the online merchant 150 may consider the user to be authentic.

For example, in conducting a transaction, the user may send the online merchant 150 such information as the user's telephone number, the user's address, the user's credit card number, and/or other information known to the user but possibly not known to someone attempting to impersonate the user. The user's service provider may possess valid values for such parameters and may transmit the valid values to the online merchant 150 via the token 112 or via the message 190 containing the user data 116. The online merchant 150 may compare the valid values received from the service provider to the values entered by the user. If the two sets of values match, the online merchant 150 may proceed with the transaction under the assumption that the user is authentic.

If the user wishes to purchase an item advertised by the online merchant 150, the user may send an indication of that wish to the online merchant 150. The online merchant 150 may then return to the user a page containing a form with a large number of fields to be filled in with information such as name, billing address, shipping address, credit card number, and other information typically used in online transactions. Entering such information may be difficult and tedious for the user, especially when using the small display screen and small data entry mechanisms typically present on a mobile device. The inconvenience of manually entering such information into a mobile device may cause the user to abandon the transaction and thus may cause the online merchant to lose a potential sale.

In an embodiment, the online merchant 150 may use the information received via the token 112 or via the user data 116 in the message 190 to assist the user in completing a form that may need to be filled out to complete a transaction between the user and the online merchant 150. At some point during a transaction, the mobile device 120 may display a message informing the user that information required to complete the transaction is available for automatic insertion into the appropriate fields of a form. The mobile device 120 may also inform the user that the automatic insertion may proceed if the user enters a PIN that has previously been agreed upon to be used for such a purpose, and the mobile device 120 may display a field for the entry of a PIN. If the user enters a PIN, the entered PIN may be sent directly to the online merchant 150 or may be sent to the online merchant 150 via the service provider. The online merchant 150 may compare the PIN received in this manner to the PIN that was received via the token 112 or via the message 190. If the PINs match, the online merchant 150 may determine that at least a portion of the information needed to complete the transaction may be safely transmitted to the mobile device 120. The online merchant 150 may have received such information from the token 112 or from the user data 116 in the message 190 and may provide the information to the mobile device 120 by inserting the information in the proper fields of a form the user is filling out, by sending the mobile device 120 a new form with the information included, or in some other manner.

Such automated population of one or more fields in an online form may reduce the difficulty and tediousness the user of the mobile device 120 may experience if the form were to be completed fully manually. In an embodiment, the entire procedure from the time the user clicks on the advertisement to the time an online form is completed may occur in less than one second, thus greatly facilitating the user's task of completing the form. This benefit to the user may in turn benefit the online merchant 150 by increasing the likelihood that the user will carry a sales transaction through to completion. The automated population of fields in an online form may be the bridge of the third gap in the online purchasing procedure.

The online merchant 150 may also use the information received via the token 112 or via the message 190 to target or otherwise customize a message 195, such as an advertisement, to the user of the mobile device 120. The targeting or customization may apply to subsequent advertisements sent to the mobile device 120 in response to a click-through on the advertisement 140 and may be based on the device information, the user profile information, such as the device user's age, gender, income, location, or past behavior, and/or any other information in the token 112 or in the user data 116. The targeting of a subsequent advertisement based on a click-through on a previous advertisement may be the bridge of the second gap in the online purchasing procedure.

As an example, the advertisement 140 to which the user has responded may be a generic advertisement for a clothing store operated by the online merchant 150. If the token 112 or the user data 116 that the online merchant 150 receives as a result of the user's click-through includes information indicating the user's gender, the online merchant may respond to the click-through by sending another advertisement to the mobile device 120 advertising clothing appropriate for the user's gender.

As another example, the online merchant 150 may be an automobile manufacturer selling vehicles in a wide variety of price ranges, and the advertisement 140 may mention several different models produced by the manufacturer. If the user of the mobile device 120 clicks on the advertisement 140, and if the information in the token 112 or in the user data 116 indicates that the user has a relatively high income and has tended to purchase luxury items in the past, the online merchant 150 may send the user a subsequent advertisement advertising automobiles in an upper price range. If the information in the token 112 or in the user data 116 indicates that the user of the mobile device 120 has a relatively low income and has tended to purchase more economical items, the online merchant 150 may send the user a subsequent advertisement advertising automobiles in a lower price range.

As yet another example, the online merchant 150 may operate multiple restaurants that are geared toward multiple market segments. Based on location information, behavior information, and other information in the token 112 or the user data 116, the online merchant 150 may elect to send the mobile device 120, in the message 195, an advertisement and/or a coupon for a restaurant that is near the device user's current location and that is deemed to be likely to appeal to the user. The content of the advertisement may depend at least partially on the capabilities of the mobile device 120. For example, if the mobile device 120 has the processing and graphical capabilities to display video images, coupons, and other complex graphics, the online merchant 150 may send the mobile device 120 an advertisement with such content. If the mobile device 120 does not have such capabilities, the online merchant 150 may send the mobile device 120 a simpler advertisement.

Using the information received via the token 112 or via the user data 116 in the message 190 in the ways described above may assist the online merchant 150 in preventing fraud, improving online experiences for customers, and customizing messages to customers. The embodiments disclosed herein may thus provide a beneficial feature that a service provider can offer to the online merchant 150. A service provider that offers such features may be more attractive to the online merchant 150 as an intermediary for the placement of advertisements than a service provider that does not offer such features. Therefore, offering such features may provide a competitive advantage to a service provider in attracting fees paid by online merchants for the service provider's intermediary role in the placement of advertisements.

Figure 3:
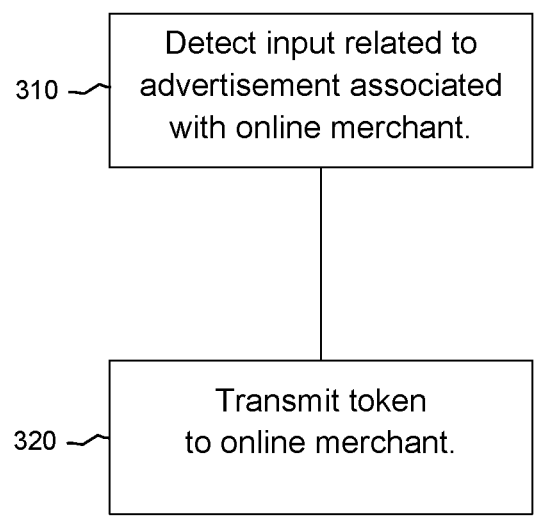
FIG. 3 is a flow chart illustrating a method for communication by a mobile telecommunication device according to an embodiment of the disclosure.

FIG. 3 is a flowchart illustrating an embodiment of a method for communication by a mobile telecommunication device. At block 310, the mobile telecommunication device detects an input related to an advertisement displayed on the mobile communication device and associated with an online merchant. At block 320, responsive to detecting the input, the mobile communication device transmits to the online merchant a token stored in a memory location in the mobile communication device. The token may contain information for facilitating a transaction between the mobile telecommunication device and the online merchant.

Figure 4:
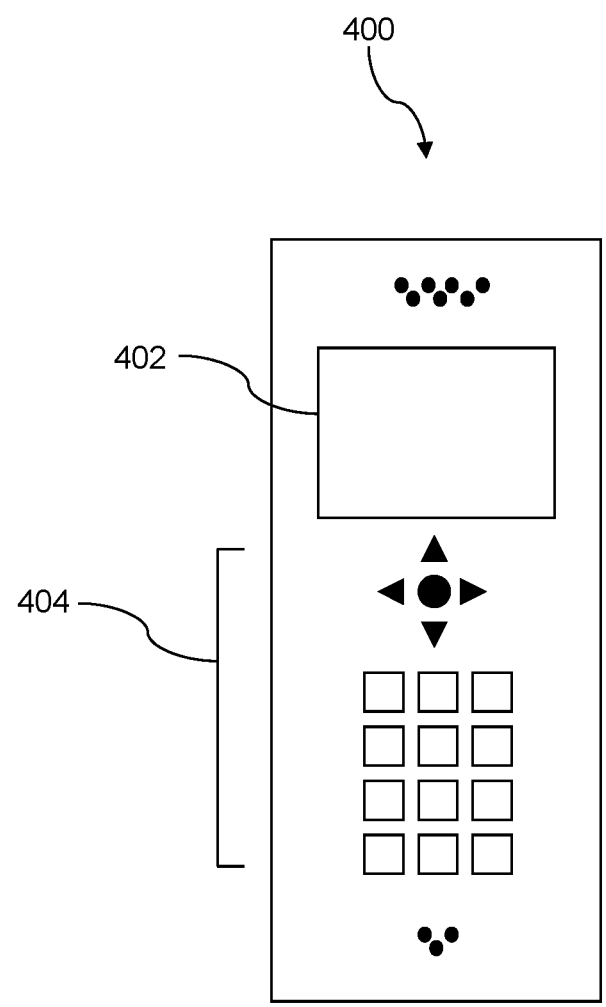
FIG. 4 is an illustration of a mobile telecommunication device according to an embodiment of the disclosure.

FIG. 4 depicts a mobile device 400 operable for implementing aspects of the present disclosure, but the present disclosure should not be limited to these implementations. Though illustrated as a mobile phone, the mobile device 400 may take various forms including a tablet computer, a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
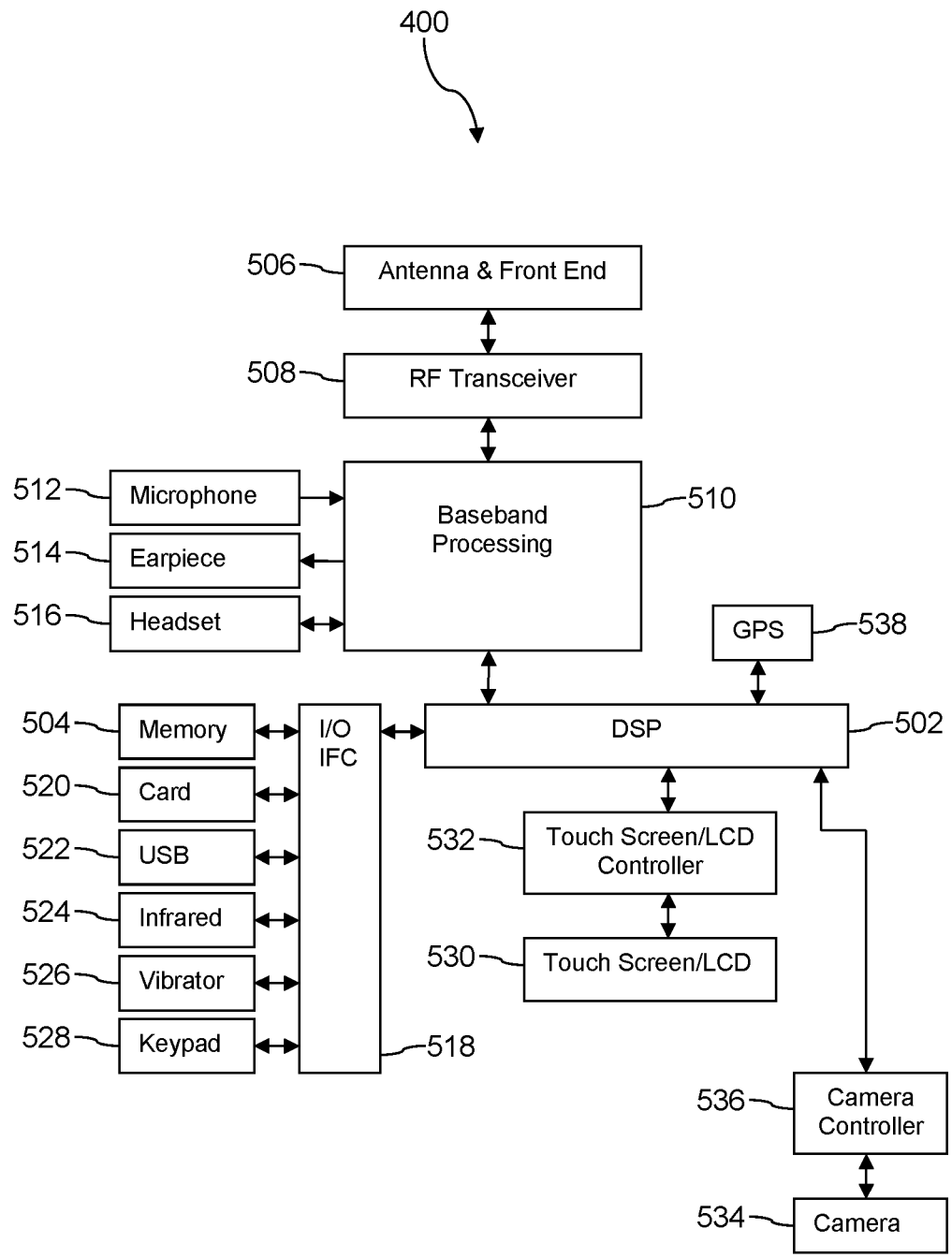
FIG. 5 is a block diagram of a mobile telecommunication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
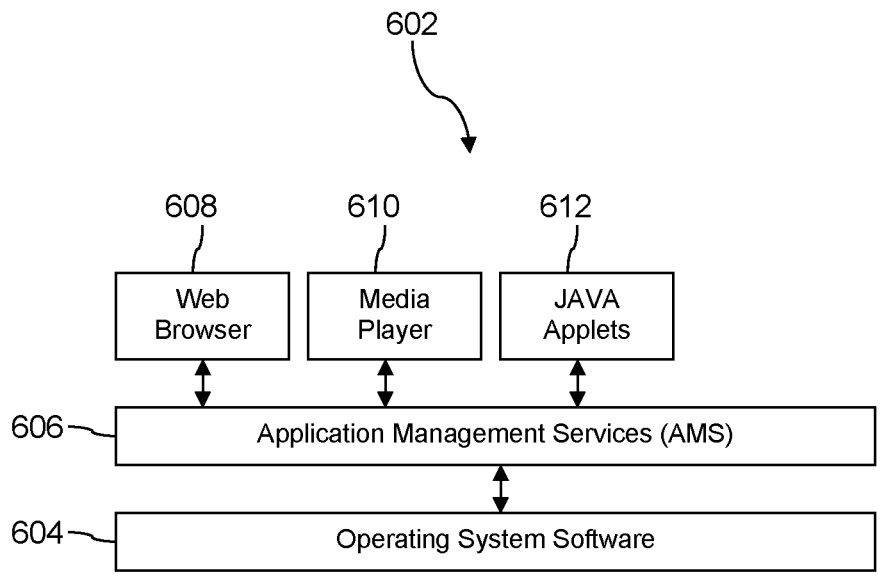
FIG. 6A is a block diagram of a software architecture of a mobile telecommunication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
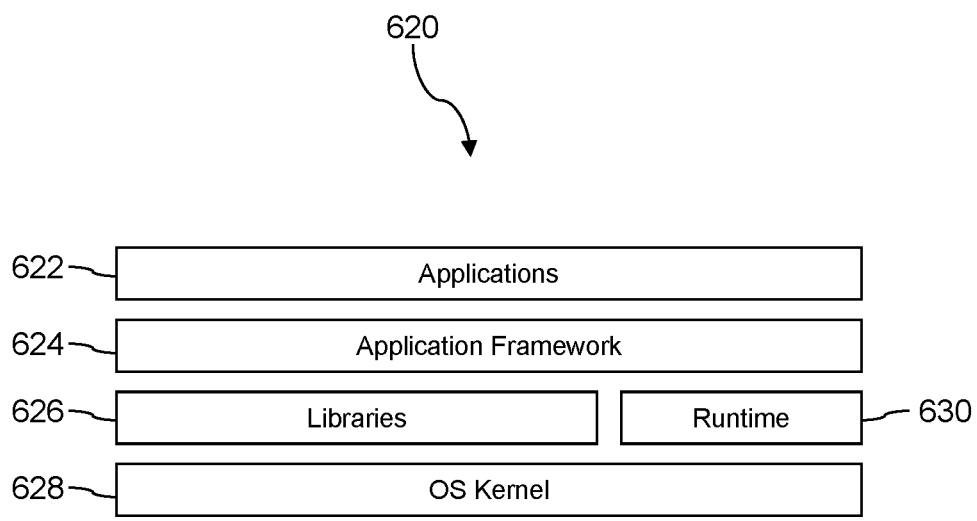
FIG. 6B is a block diagram of another software architecture of a mobile telecommunication device according to an embodiment of a disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
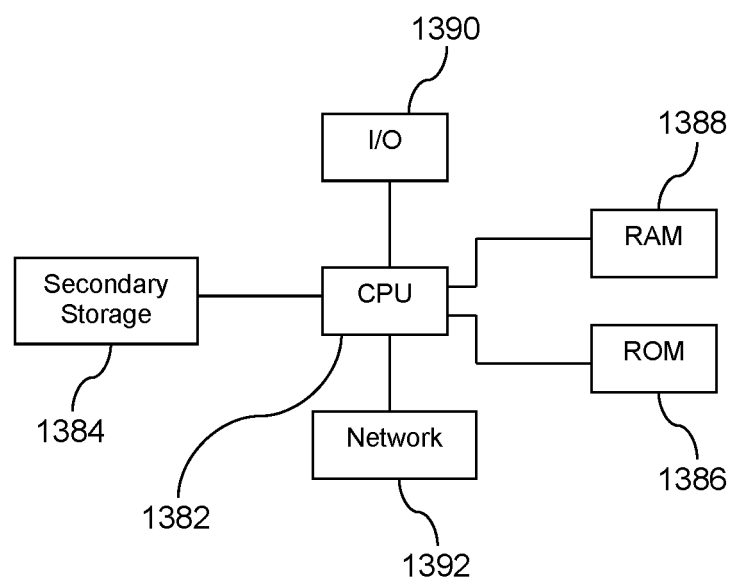
FIG. 7 is a block diagram of a computer system according to an embodiment of the disclosure.

FIG. 7 illustrates a computer system 1380 suitable for implementing one or more embodiments disclosed herein. The computer system 1380 includes a processor 1382 (which may be referred to as a central processor unit or CPU) that is in communication with memory devices including secondary storage 1384, read only memory (ROM) 1386, random access memory (RAM) 1388, input/output (I/O) devices 1390, and network connectivity devices 1392. The processor 1382 may be implemented as one or more CPU chips.

It is understood that by programming and/or loading executable instructions onto the computer system 1380, at least one of the CPU 1382, the RAM 1388, and the ROM 1386 are changed, transforming the computer system 1380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 1384 is typically comprised of one or more disk drives or tape drives and is used for non-volatile storage of data and as an over-flow data storage device if RAM 1388 is not large enough to hold all working data. Secondary storage 1384 may be used to store programs which are loaded into RAM 1388 when such programs are selected for execution. The ROM 1386 is used to store instructions and perhaps data which are read during program execution. ROM 1386 is a non-volatile memory device which typically has a small memory capacity relative to the larger memory capacity of secondary storage 1384. The RAM 1388 is used to store volatile data and perhaps to store instructions. Access to both ROM 1386 and RAM 1388 is typically faster than to secondary storage 1384. The secondary storage 1384, the RAM 1388, and/or the ROM 1386 may be referred to in some contexts as computer readable storage media and/or non-transitory computer readable media.

I/O devices 1390 may include printers, video monitors, liquid crystal displays (LCDs), touch screen displays, keyboards, keypads, switches, dials, mice, track balls, voice recognizers, card readers, paper tape readers, or other well-known input or output devices.

The network connectivity devices 1392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 1392 may enable the processor 1382 to communicate with the Internet or one or more intranets. With such a network connection, it is contemplated that the processor 1382 might receive information from the network, or might output information to the network in the course of performing the above-described method steps. Such information, which is often represented as a sequence of instructions to be executed using processor 1382, may be received from and outputted to the network, for example, in the form of a computer data signal embodied in a carrier wave.

Such information, which may include data or instructions to be executed using processor 1382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 1382 executes instructions, codes, computer programs, scripts which it accesses from hard disk, floppy disk, optical disk (these various disk based systems may all be considered secondary storage 1384), ROM 1386, RAM 1388, or the network connectivity devices 1392. While only one processor 1382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 1384, for example, hard drives, floppy disks, optical disks, and/or other device, the ROM 1386, and/or the RAM 1388 may be referred to in some contexts as non-transitory instructions and/or non-transitory information.

In an embodiment, the computer system 1380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 1380 to provide the functionality of a number of servers that is not directly bound to the number of computers in the computer system 1380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 1380, at least portions of the contents of the computer program product to the secondary storage 1384, to the ROM 1386, to the RAM 1388, and/or to other non-volatile memory and volatile memory of the computer system 1380. The processor 1382 may process the executable instructions and/or data structures in part by directly accessing the computer program product, for example by reading from a CD-ROM disk inserted into a disk drive peripheral of the computer system 1380. Alternatively, the processor 1382 may process the executable instructions and/or data structures by remotely accessing the computer program product, for example by downloading the executable instructions and/or data structures from a remote server through the network connectivity devices 1392. The computer program product may comprise instructions that promote the loading and/or copying of data, data structures, files, and/or executable instructions to the secondary storage 1384, to the ROM 1386, to the RAM 1388, and/or to other non-volatile memory and volatile memory of the computer system 1380.

In some contexts, the secondary storage 1384, the ROM 1386, and the RAM 1388 may be referred to as a non-transitory computer readable medium or a computer readable storage media. A dynamic RAM embodiment of the RAM 1388, likewise, may be referred to as a non-transitory computer readable medium in that while the dynamic RAM receives electrical power and is operated in accordance with its design, for example during a period of time during which the computer 1380 is turned on and operational, the dynamic RAM stores information that is written to it. Similarly, the processor 1382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system comprising:
a mobile telecommunication device that comprises:
a non-transitory memory having a location storing a token containing information for facilitating a transaction between the mobile telecommunication device and an online merchant computer system, wherein the information for facilitating the transaction comprises at least one of:
a user profile for a user of the mobile telecommunication device,
information about the mobile telecommunication device,
a personal identification number for the user of the mobile telecommunication device, or
a key for retrieving from a service provider server at least one of the user profile, the information about the device, or the personal identification number; and
a processor configured such that, responsive to the mobile telecommunication device detecting an input related to an advertisement that is associated with the online merchant computer system and that is displayed on the mobile telecommunication device, the mobile telecommunication device:
determines that the advertisement displayed on the mobile telecommunication device corresponds with the token,
responsive to the determination, retrieves the token from the location in the non-transitory memory,
appends the token to a message indicating that the input occurred in response to the advertisement being displayed on the mobile telecommunication device, and
transmits the token with the message to the online merchant computer system, wherein the token comprises the key; and
the online merchant computer system configured to:
receive the token from the mobile communication device,
use the key from the token to gain access to information associated with the user stored by the service provider server by providing the key to the service provider server,
receive the stored information associated with the user based on validation of the key by the service provider server, and
facilitate the transaction based on the stored information received from the service provider server, wherein the facilitating of the transaction comprises automatically populating on behalf of the user at least one field in a form needed to complete the transaction and displayed on the mobile telecommunication device with at least some of the stored information received from the service provider server.

2. The system of claim 1, wherein the token is generated by the mobile communication device.

3. The system of claim 1, wherein the processor is further configured such that the mobile communication device receives the token from the service provider server.

4. The system of claim 1, wherein the user profile includes at least one of the user's age, the user's gender, the user's income, the user's location, the user's billing information, the user's shipping information, a history of web sites the user has visited, a history of the user's use of applications on the device, or preferences expressed by the user.

5. The system of claim 1, wherein the information about the mobile communication device includes at least one of a model identifier for the device or at least one capability of the device.

6. The system of claim 1, wherein a message conveying the advertisement from the service provider to the mobile communication device includes an indicator indicating that the token is to be transmitted to the online merchant computer system responsive to the mobile communication device detecting the input related to the advertisement.

7. The system of claim 1, wherein the online merchant computer system is further configured to determine that a personal identification number entered into the mobile telecommunication device matches to a personal identification number known to be associated with the mobile telecommunication device, and wherein the online merchant computer system populates the at least one field in the form is in response to the determination that the personal identification number entered into the mobile telecommunication device matches the personal identification number known to be associated with the mobile telecommunication device.

8. The system of claim 7, wherein the personal identification number known to be associated with the mobile telecommunication device comprises the personal identification number from the token or a personal identification number received from the service provider server.

9. A method for facilitating an online transaction on a mobile telecommunication device, the method comprising:
  receiving, by the mobile telecommunication device, an advertisement associated with an online merchant computer system;
  receiving, by the mobile telecommunication device from a service provider server, a token containing information for facilitating a transaction between the mobile communication device and an online merchant computer system, wherein the token comprises a key for retrieving information associated with a user of the mobile telecommunication device from the service provider server;
  displaying the advertisement on the mobile telecommunication device;
  responsive to detecting an input related to the advertisement:
    appending, by the mobile telecommunication device, the token to a message indicating that the input occurred in response to the advertisement being displayed on the mobile telecommunication device; and
    transmitting, by the mobile telecommunication device, the token with the message to the online merchant computer system;
  receiving, by the online merchant computer system, the token from the mobile communication device;
  using, by the online merchant computer system, the key from the token to gain access to information associated with the user stored by the service provider server by providing the key to the service provider server;
  receiving, by the online merchant computer system, the stored information associated with the user based on validation of the key by the service provider server; and
  facilitating, by the online merchant computer system, the transaction based on the stored information received from the service provider server, wherein the facilitating the transaction comprises automatically populating on behalf of the user at least one field in a form needed to complete the transaction and displayed on the mobile telecommunication device with at least some of the stored information received from the service provider server.

10. The method of claim 9, wherein the token is generated prior to the transmission of the advertisement, stored on the service provider server for the mobile telecommunication device, and retrieved from storage for transmission with the advertisement.

11. The method of claim 9, wherein the token is generated at substantially the time the advertisement is to be transmitted to the mobile telecommunication device.

12. The method of claim 9, wherein the information for facilitating the online transaction further comprises at least one of:
  a user profile for the user of the mobile telecommunication device, wherein the user profile includes at least one of the user's age, the user's gender, the user's income, the user's location, the user's billing information, the user's shipping information, a history of web sites the user has visited, a history of the user's use of applications on the mobile telecommunication device, and preferences expressed by the user;
  information about the mobile telecommunication device including at least one of a model identifier for the mobile telecommunication device and at least one capability of the mobile telecommunication device; or
  a personal identification number for the user of the mobile telecommunication device.

13. The method of claim 9, further comprising verifying, by the online merchant computer system, information entered into the mobile telecommunication device by comparing the information entered into the mobile telecommunication device to at least one of:
  information in the token, or
  the stored information received by the online merchant computer system from the service provider server via the key included in the token.

14. The method of claim 13, wherein the online merchant computer system populates the at least one field in the form is in response to the verifying.

15. The method of claim 9, further comprising customizing, by the online merchant computer system, a message to the user of the mobile telecommunication device, wherein the customization is based on at least one of:
  information in the token, or
  the stored information received from the service provider server via the key included in the token.

16. A method for facilitating an online transaction on a mobile telecommunication device, the method comprising:
  detecting, by the mobile telecommunication device, an input related to an advertisement displayed on the mobile telecommunication device and associated with an online merchant computer system;
  responsive to detecting the input:
    determining, by the mobile telecommunication device, that the advertisement displayed on the mobile telecommunication device corresponds with a token containing information for facilitating a transaction between the mobile telecommunication device and the online merchant computer system, wherein the token comprises a key for retrieving information associated with a user of the mobile telecommunication device from a service provider server;
    responsive to the determination, retrieving, by the mobile telecommunication device, the token from a non-transitory memory of the mobile telecommunication device;

appending, by the mobile telecommunication device, the token to a message indicating that the input occurred in response to the advertisement being displayed on the mobile telecommunication device;

transmitting, by the mobile telecommunication device, the token with the message to the online merchant computer system;

receiving, by the online merchant computer system, the token from the mobile communication device;

using, by the online merchant computer system, the key from the token to gain access to information associated with the user stored by the service provider server by providing the key to the service provider server;

receiving, by the online merchant computer system, stored information associated with the user based on validation of the key by the service provider server; and facilitating, by the online merchant computer system, the transaction based on the stored information received from the service provider server, wherein the facilitating the transaction comprises automatically populating on behalf of the user at least one field in a form needed to complete the transaction and displayed on the mobile telecommunication device with at least some of the stored information received from the service provider server.

17. The method of claim 16, wherein the information for facilitating the transaction further comprises at least one of:
a user profile for the user of the mobile telecommunication device, wherein the user profile includes at least one of the user's age, the user's gender, the user's income, the user's location, the user's billing information, the user's shipping information, a history of web sites the user has visited, a history of the user's use of applications on the mobile telecommunication device, and preferences expressed by the user;

information about the mobile telecommunication device including at least one of a model identifier for the mobile telecommunication device and at least one capability of the mobile telecommunication device; or a personal identification number for the user of the mobile telecommunication device.

18. The method of claim 16, further comprising at least one of:
verifying, by the online merchant computer system, information entered into the mobile telecommunication device by comparing the information entered into the mobile telecommunication device to at least one of information in the token or the stored information received by the online merchant computer system from the service provider server via the key included in the token; or customizing, by the online merchant computer system a message to the user of the mobile telecommunication device, wherein the customization is based on at least one of information in the token or the stored information received from the service provider server via the key included in the token.

19. The method of claim 18, wherein the online merchant computer system populates the at least one field in the form is in response to the verifying.

20. The method of claim 16, wherein a message conveying the advertisement from the service provider computer system to the mobile telecommunication device includes an indicator indicating that the token is to be transmitted to the online merchant server responsive to the mobile telecommunication device detecting the input related to the advertisement.

* * * * *